United States Patent [19]

Thompson et al.

[11] 3,909,354

[45]*Sept. 30, 1975

[54] PROCESS FOR ISOMERIZING GLUCOSE TO FRUCTOSE

[75] Inventors: Kenneth N. Thompson; Richard A. Johnson; Norman E. Lloyd, all of Clinton, Iowa

[73] Assignee: Standard Brands Incorporated, New York, N.Y.

[ * ] Notice: The portion of the term of this patent subsequent to Jan. 29, 1991, has been disclaimed.

[22] Filed: Nov. 19, 1973

[21] Appl. No.: 417,027

Related U.S. Application Data

[63] Continuation-in-part of Ser. No. 88,190, Nov. 9, 1970, Pat. No. 3,788,945.

[52] U.S. Cl. ............................................. 195/31 F
[51] Int. Cl.² ............................................ C12B 1/00

[58] Field of Search ........ 195/31 F, 63, 68, DIG. 11

[56] References Cited

UNITED STATES PATENTS 3,788,945   1/1974   Thompson et al................ 195/31 F

OTHER PUBLICATIONS

Barker et al., Process Biochemistry Oct. 1971, Vol. 6, No. 10, pages 11–13.

*Primary Examiner*—Lionel M. Shapiro

[57] ABSTRACT

Glucose isomerase bound to an inert carrier is maintained in suspension while being contacted with a glucose containing solution under specific conditions whereby a portion of the glucose is converted to fructose.

14 Claims, No Drawings

3,909,354

PROCESS FOR ISOMERIZING GLUCOSE TO FRUCTOSE

THE INVENTION

This application is a continuation in part of patent application Ser. No. 88,190, filed Nov. 9, 1970, now U.S. Pat. No. 3,788,945.

This invention relates to a process of enzymatically converting a portion of the glucose in a glucose-containing solution to fructose.

There are many processes known in the art for producing fructose-containing solutions. These processes may be grouped into three broad categories. In the first category, sucrose is inverted to glucose and fructose by the use of an acid or invertase.

In the second category, glucose is converted to fructose by the use of alkaline catalysts. There are many papers and patents which disclose various alkaline catalysts and the use thereof for converting glucose to fructose. Exemplary of processes using alkaline catalysts are those disclosed, for instance, in U.S. Pat. No. 2,487,121 to Fetzer et al.; U.S. Pat. No. 2,746,889 to Langlois et al.; U.S. Pat. No. 2,354,664 to Cantor et al.; U.S. Pat. No. 3,285,776 to Scallet et al.; U.S. Pat. No. 3,383,245 to Scallet et al. and U.S. Pat. No. 3,305,395 to Scallet et al. However, there are a number of distinct disadvantages associated with alkaline isomerization. For instance, due to the non-selectivity of the alkaline catalysts various objectionable by-products are formed, such as large amounts of colored bodies and acidic materials. To refine alkaline-isomerized liquors to remove the objectionable by-products to produce an acceptable product requires rather complicated and costly procedures.

The third category for producing fructose-containing solutions involves enzymatically converting glucose in a glucose-containing solution, e.g., corn syrup, to fructose. Various microorganisms are known in the art which produce glucose isomerase. For example, in an article appearing in Science, Vol. 125, pp. 648–9 (1957), it is disclosed that an enzyme derived from *Pseudomonas hydrophila* will isomerize glucose to fructose. Also, British Pat. No. 1,103,394 and Japanese Pat. No. 7428 (1966) to Takasaki et al. disclose that microorganisms classified as belonging to the Streptomyces genus, such as *Streptomyces flavovirens*, *Streptomyces achromogenes*, *Streptomyces echinatus* and *Streptomyces albus*, produce glucose isomerase. There are many other microorganisms which are disclosed in the art as producing glucose isomerase. A few of the other microorganisms disclosed are, for instance, *Aerobacter cloacae*, *Bacillus megaterium*, *Acetobacter suboxydans*, *Acetobacter melanogenus*, *Acetobacter roseus*, *Acetobacter oxydans*, *Bacillus fructose* and *Lactobacillus fermenti*.

Because of the economics involved in producing glucose isomerase, it is of the utmost importance to use the isomerase under conditions whereby maximum yields of fructose are produced using minimum quantities of glucose isomerase. MOreover, the conditions for isomerization should be such that minimal quantities of objectionable by-products are produced.

Glucose isomerase is produced primarily intracellularly by a number of the above microorganisms. Thus, the major portion of the glucose isomerase is found within and/or on the cell walls of the microorganisms. Normally when these cells are used to isomerize glucose to fructose, the isomerase during isomerization is released or is extracted therefrom. When the isomerase is released or extracted from the cells it is essentially solubilized. It would involve a rather costly and complicated procedure to recover the solubilized isomerase so that it can be used in another isomerization reaction.

In an article entitled "A Continuous Glucose Isomerization Method by an Adsorbed Enzyme Column" by Tsumura et al., published in Nippon Shokuhin Kogyo Gakkaishi, 14 (12) 1967, glucose isomerase derived from *Streptomyces phaeochromogenes* was bound to DEAE-Sephadex. This bound enzyme was placed in a column and a glucose solution was continuously passed therethrough. As the glucose contacted the bound enzyme, fructose was continuously produced. Although the process disclosed in this article apparently presents a partial solution to the problem of reusing glucose isomerase, it was conducted on such a small scale that the processing parameters are not applicable to commercial practice. It would therefore be difficult, if not substantially impossible, to reduce this process to commercial scale and produce a glucose-fructose-containing solution of acceptable quality.

U.S. Pat. No. 3,708,397 to Sipos discloses that glucose isomerase derived from *Streptomyces phaeochromogenes* may be immobilized on basic anion exchange resins such as DEAE-, TEAE- and ECTEOLA-celluloses.

It is the principal object of the present invention to provide a continuous process for enzymatically isomerizing glucose to fructose.

This object and other objects which will be apparent from the following are attained in accordance with the present invention by continuously introducing a glucose-containing solution having a viscosity of from about 0.5 to about 100 centipoise, a pH in the range of from about 6 to about 9, a temperature in the range of from about 20° to about 80°C and containing from about 5 to about 80 percent glucose by weight into a zone containing particles of bound glucose isomerase selected from the group consisting of glucose isomerase bound to anion exchange cellulose and glucose isomerase bound to a synthetic anion exchange resin whereby the particles of the bound glucose isomerase are maintained in suspension and up to 54 percent of the glucose is converted to fructose, the color of the converted solution is increased by less than 2 color units and there is no substantial production of psicose and withdrawing said converted solution from said zone at a rate substantially equivalent to the rate said glucose containing solution is introduced into said zone, the particles of the bound glucose isomerase being characterized as having a glucose isomerase activity of at least 3 IGIU per cubic centimeter when packed in a bed and a stability value of at least 50 hours.

Various terms and expressions used in the foregoing and in the following discussion and examples are defined as follows:

STABILITY VALUE

The stability value is determined by placing a sufficient amount of the bound glucose isomerase in a column to obtain from 1000 to 4000 IGIU therein. A solution that is 3 molar in glucose, at a pH of 6.5, 0.001 molar in $CoCl_2$ and 0.005 molar in $MgSO_3$ is passed through the column at a rate of from 10 to about 200 ml/hr.

The column is maintained at a temperature of 60°C. The fraction of glucose converted to fructose in the effluent is determined after 4 hours to insure that the bed of bound glucose isomerase is under equilibrium conditions. The activity index of the bound glucose isomerase is calculated using the following formula:

Activity index = (R/E) log (0.504/(0.504-I))

where I is the fraction of glucose converted to fructose, R is the flow rate (ml/hr) and E is the number of IGIU initially in the column.

The activity index is determined periodically and the time it takes for the activity index to reach one-half the initial value (value after 4 hours) is the stability value in hours.

COLOR UNITS

Color was determined spectrophotometrically by measuring the absorbance at 450 $\mu$ and 600 $\mu$ of an appropriately diluted liquor in a 1-cm cell versus water as a reference. The spectrophotometer was a Beckman DK-2A, manufactured by Beckman Instrument Company. The color was calculated by using the following formula:

$$\text{Color Units} = \frac{(109)(A_{450} - A_{600})}{C}$$

$A_{450}$ = absorbance at 450 $\mu$
$A_{600}$ = absorbance at 600 $\mu$
$C$ = concentration (g/100 ml)

FRUCTOSE CONTENT OF ISOMERIZED LIQUOR

Fructose content of the isomerized liquor may be determined by measuring the change in specific rotation which occured during isomerization. Specific rotations were measured using a Bendix Corporation NPL Model 969 Automatic Polarimeter. The rotations were determined at a concentration of 2.5 g/100 ml in a glass cell thermostated at 25°C. The path of the cell was 50 mm. The specific rotations were determined at the beginning of the isomerization reactions after all ingredients in the glucose-containing solutions had been combined. To determine change in fructose content, the specific rotation of the isomerized liquor was determined. Change in fructose content was calculated by using the following formula:

$$\text{Percent Fructose} = \frac{100(A_1 - A_0)}{-138.9}$$

$A_1$ = specific rotation of isomerized liquor
$A_0$ = specific rotation of glucose-containing solution before isomerization In the formula, the factor −138.9 is the change in specific rotation which occurs when glucose is converted completely to fructose.

IGIU

IGIU is the abbreviation for International Glucose Isomerase Unit and is that amount of enzyme which will convert 1 micromole of glucose to fructose per minute in a solution initially containing 2 moles of glucose per liter, 0.02 moles of $MgSO_4$ per liter and 0.001 moles of $CoCl_2$ per liter at a pH of 6.84 to 6.85 (0.2M sodium maleate) and a temperature of 60°C.

Maintaining the particles of bound glucose isomerase in suspension may be accomplished in any convenient manner. For instance, particles of bound glucose isomerase may be placed in a suitable vessel having a top outlet and bottom inlet. Positioned in the outlet and inlet may be a screen or other suitable porous means. The glucose containing solution is continuously introduced into the vessel through the bottom inlet at a rate and under conditions whereby the particles of the bound glucose isomerase are fluidized and maintained in suspension in the glucose solution. A portion of the glucose in the solution is thereby converted to fructose and the fructose-containing solution is withdrawn through the top outlet.

Another method for maintaining the glucose isomerase in suspension or fluidized in a glucose containing solution is by the use of a mechanical stirring device. For example, a suitable vessel may be provided with outlet and inlet means and a stirring device. Particles of bound glucose isomerase are provided in the vessel and the glucose-containing solution is introduced by a suitable pumping means into the vessel through the inlet. The mechanical stirring device agitates the solution so that the particles of the bound glucose isomerase are maintained in suspension. A portion of the glucose is converted to fructose and this converted solution exits the outlet.

The degree to which the glucose is converted to fructose is dependent upon many factors, such as the period for which the glucose is maintained in contact with the bound glucose isomerase, the temperature at which the reaction is performed, the specific activity of the bound glucose isomerase and other factors.

The process of the present invention provides a number of distinct advantages. For example, it provides a process which may easily and economically be performed in a commercial operation. Furthermore, it is extremely efficient in respect to the utilization of the glucose isomerase and the production of a fructose-containing solution containing minimal color, ash and psicose. Moreover, the isomerization may be performed continuously which, of course, is a distinct advantage in any manufacturing operation.

There are many methods known in the art for the production of glucose-containing solutions. For instance, the methods which are currently being practiced commercially principally involve saccharifying cornstarch into glucose. These methods may be grouped into three categories. The first is an acid process in which a dilute acid solution is used to hydrolyze starch to glucose. The second is an acid-enzyme process in which the starch is liquefied by a mild acid treatment and then an enzyme is used to convert the liquefied starch to glucose. The third is an enzyme-enzyme process in which two enzyme treatments are used, the first to liquefy the starch and the second to convert the liquefied starch to glucose. In the process of the present invention, it is preferred to use a glucose-containing solution produced by either of the latter two processes since such solutions, generally, contain greater amounts of dextrose on a dry substance weight basis, lesser amounts of acids, less color and lower amounts of oligosaccharides. The glucose-containing solution may be refined, if desired, by conventional means prior to its being subjected to the process of the present invention.

The viscosity of the glucose-containing solution should be in the range of from about 0.5 to about 100 centipoise and preferably should be from about 2 to about 20 centipoise. If the viscosity of the solution is too high, it will be difficult, if not impossible, to maintain the particles of bound glucose isomerase in suspension.

The stability value of the bound glucose isomerase should be at least 50 hours, preferably at least about 300 hours and most preferably at least about 400 hours.

Forming the bound glucose isomerase may be accomplished in any convenient manner so long as the bound glucose isomerase has the characteristics set forth above. It is contemplated that glucose isomerase may be bound to a host of inert carriers. For instance, glucose isomerase may be bound to DEAE-cellulose (diethylaminoethyl cellulose) or like material and excellent results will be obtained. Of course, to effectuate binding the glucose isomerase must be removed from the cells and there must be no interfering substances present during binding. The binding may be accomplished in an aqueous medium or in a sugar solution, e.g., corn syrup. Also the glucose isomerase may be bound on inert carriers either along with cellular material or in a relatively pure state. Various polymeric materials may be suitable for this purpose but, of course, the porosity of such materials must be such that allows the glucose to contact the glucose isomerase.

The concentration of glucose in the glucose-containing solution should be in the range of from about 5 to about 80 percent by weight and preferably should be in the range of from about 40 to about 60 percent on the same weight basis.

The pH of the glucose-containing solution should be in the range of from about 6 to about 9, preferably from about 6.5 to about 8 and most preferably from about 7 to about 7.5. It is important to maintain the pH of the glucose-containing solution within this range during the isomerization reaction since if the solution is outside this range, the isomerase will be quickly inactivated and/or large amounts of unwanted by-products such as color and psicose will be produced. In the glucose-containing solution there may be various metal ion activators and/or stabilizers for the isomerase, such as soluble salts of cobalt, magnesium, etc.

In Table I, below, the essential characteristics of the isomerized fructose-containing solution produced by the method of the present invention are shown.

EXAMPLE I

This example illustrates the use of glucose isomerase bound to a porous, synthetic anion-exchange resin in a fluidized bed to continuously convert glucose to fructose.

Streptomyces sp. ATCC 21175 was grown under submerged aerobic conditions and sufficient $CoCl_2.6H_2O$ and a cationic surfactant (Variquat 50 MC — Varney Chemical Division of Northern Petrochemical Company) was added to obtain in the resulting broth 240 ppm and 1600 ppm, respectively.

The broth was continuously stirred for 5 hours while being maintained at 40°C. and a pH of 6.5. The broth was then cooled to about 15°C. and filtered. The filtrate had a glucose isomerase activity of 11.4 IGIU/ml. To four liters of the filtrate was added 12 grams of cationic cellulose (Whatman DE-23) to adsorb non-isomerase proteinaceous materials. The cationic cellulose was removed by filtration. The filtrate had a glucose isomerase activity of 11.2 IGIU/ml.

Eight hundred and thirty grams of moist Amberlite IRA-938 anion exchange resin (Rohm & Haas) was added to 3 liters of 1.5 normal NaOH. The resin was stirred at 60°C. for 15 minutes, filtered, rinsed with demineralized water, restirred in 4 liters of 2N HCl at 60°C. for 15 minutes, filtered, rinsed with demineralized water, stirred in demineralized water at a pH of 7 and filtered. This resin was added to 4 liters of the previously described glucose isomerase filtrate having a glucose isomerase activity of 11.2 IGIU/ml and maintained therein for 1 hour at 60°C., filtered and washed. The filtrate and wash water were collected and the glucose isomerase activity thereof determined.

Based upon the difference between the glucose isomerase activity of this filtrate and wash water and the glucose isomerase activity of the filtrate to which the resin was added, it was calculated that the resin adsorbed 46.5 IGIU/g. Based upon this calculated value the resin had a glucose isomerase activity of 29.9 IGIU per cubic centimeter when packed in a bed and an estimated stability value of 600 hours.

A refined glucose-containing solution containing 90.5 percent glucose, 2.0 percent fructose and 52.1 percent dry substance was diluted with water to obtain solutions containing about 10, 20, 30 and 40 percent dry substance. To each solution was added 0.005 moles of $MgSO_3$ per liter and the pH of the solutions was adjusted to 7.4.

TABLE I

CHARACTERISTICS OF UNREFINED FRUCTOSE CONTAINING SOLUTIONS
PER CENT DRY BASIS

|  | Glucose* | Fructose* | Polysaccharide* | Psicose | Ash** | Color Units |
|---|---|---|---|---|---|---|
| Typical Range | 30 to 60 | 10 to 54 | 0 to 50 | 0 to 1 | 0.1 to 0.5 | 0 to 0.2 |
| Preferred Range | 30 to 60 | 10 to 54 | 0 to 30 | 0 to 0.5 | 0.1 to 0.2 | 0 to 0.05 |
| Most Preferred Range | 30 to 60 | 10 to 54 | 0 to 30 | 0 to 0.1 | 0.05 to 0.1 | 0 to 0.03 |

*Amount of saccharide principally dependent on the product desired.
**Principally composed of metallic salts which are present during isomerization to stabilize and/or activate the glucose isomerase.

In order to more clearly describe the nature of the present invention, specific examples will hereinafter be described. It should be understood, however, that this is done solely by way of example and is intended neither to delineate the scope of the invention nor limit the ambit of the appended claims.

90 grams of resin containing the adsorbed glucose isomerase was stirred in 500 ml of the solution containing 10 percent dry substance, heated to 40°C. and stirred under vacuum to remove entrapped air. This slurry was poured into a jacketed column having a diameter of 1 inch and a height of 24 inches wherein a constant temperature of 65°C. was maintained. The upper and lower ends of the column were equipped with screens to maintain the resin therein.

The previously prepared solutions were pumped through a heated coil to adjust their temperature to 65°C. and then pumped into the bottom of the column wherein the bound glucose isomerase was fluidized. Set forth in Table II are the flow rates of the solutions pumped through the columns, the percent of glucose converted to fructose and the psicose content of the converted solutions.

TABLE II

FLUIDIZED BED ISOMERIZATION

| Percent Dry Substance | Solution Flow Rate (ml per min.) | Percent Glucose Converted to Fructose | Percent Psicose |
|---|---|---|---|
| 10.0 | 47.4 | 14.1 | <1 |
| 20.2 | 28.5 | 12.6 | <1 |
| 30.2 | 13.0 | 17.3 | <1 |
| 40.4 | 7.4 | 16.8 | <1 |

EXAMPLE II

This example illustrates the use of glucose isomerase bound to a porous synthetic anion-exchange resin in a stirred reactor system wherein glucose is continuously converted to fructose.

Glucose isomerase was bound to Amerlite IRA-938 (Rohm & Haas) according to the procedure set forth in Example I. Into three one-liter vacuum flasks was placed 100 grams of the resin containing the isomerase and 900 ml of a refined glucose containing solution. The refined glucose solution contained 90.5 percent on a dry substance basis glucose, 2.0 percent fructose on a dry substance basis, dry substance content of 52.1 percent, a pH of 7.4 and a $MgSO_3$ content of 0.005 moles per liter. A vacuum was applied to each flask for 10 minutes to remove entrapped air. The flasks were connected in series with the side arms of the flasks serving as the inlets. Glass tubes fitted with fritted glass filters were placed in the flasks through stoppers inserted in the necks of the flasks and served as outlets. Also through the stoppers were placed mechanical stirrers having wide blade agitators. The flasks were maintained at a temperature of 65°C. The stirrers maintained the resin in suspension. The flasks were positioned in series with the outlet of one flask attached to the inlet of the succeeding flask. The glucose-containing solution was pumped through the inlet of the first flask positioned in series and displaced an equal portion of the solution through the glass tubes. The glucose solution was pumped through the flasks at the flow rates and for the periods shown in Table III. The results of this example are shown in Table III below.

TABLE III

CONTINUOUS STIRRED REACTOR ISOMERIZATION

| Solution Flow Rate (ml per min.) | Percent Fructose Produced | Percent Psicose | Color Units |
|---|---|---|---|
| 5.33 | 39.6 | <1 | 0.013 |
| 5.40 | 40.4 | <1 | " |
| 5.30 | 39.0 | <1 | " |
| 4.80 | 38.2 | <1 | " |
| 8.00 | 30.0 | <1 | 0.007 |
| 7.00 | 29.2 | <1 | " |
| 6.80 | 25.4 | <1 | " |

What is claimed is:

1. A process of enzymatically converting glucose to fructose comprising continuously introducing a glucose-containing solution having a viscosity of from about 0.5 to about 100 centipoise, a pH in the range of from about 6 to about 9, a temperature in the range of from about 20° to about 80°C. and containing from about 5 to about 80 percent glucose by weight into a zone containing particles of bound glucose isomerase selected from the group consisting of glucose isomerase bound to an anion exchange cellulose and glucose isomerase bound to a synthetic anion exchange resin whereby the particles of the bound glucose isomerase are maintained in suspension and up to 54 percent of the glucose is converted to fructose, the color of the converted solution is increased by less than 2 color units and there is no substantial production of psicose, and withdrawing said converted solution from said zone at a rate substantially equivalent to the rate said glucose-containing solution is introduced into said zone, the particles of the bound glucose being characterized as having a glucose isomerase activity of at least 3 IGIU per cubic centimeter when packed in a bed and a stability value of at least 50 hours.

2. A process of enzymatically converting glucose to fructose as defined in claim 1, wherein the viscosity of the glucose-containing solution is from about 2 to about 20 centipoise and the pH of the solution is from about 6.5 to about 8.

3. A process of enzymatically converting glucose to fructose as defined in claim 2, wherein the glucose-containing solution contains from about 40 to about 60 percent glucose by weight and the pH of the solution is from about 7 to about 8.

4. A process of enzymatically converting glucose to fructose as defined in claim 2, wherein the stability value of the bound glucose isomerase is at least about 300 hours.

5. A process of enzymatically converting glucose to fructose as defined in claim 4, wherein the stability value of the bound glucose isomerase is at least about 400 hours.

6. A process of enzymatically converting glucose to fructose as defined in claim 1, wherein the glucose isomerase is bound to DEAE-cellulose.

7. A process of enzymatically converting glucose to fructose as defined in claim 4, wherein the glucose-containing solution introduced into the zone is produced by treating starch with an acid to liquefy the starch and then treating the liquefied starch with a glucose-forming enzyme to obtain the glucose-containing solution.

8. A process of enzymatically converting glucose to fructose as defined in claim 4, wherein the glucose-containing solution introduced into the zone is produced by treating starch with an enzyme to liquefy the starch and then treating the liquefied starch with a glucose-forming enzyme to obtain the glucose-containing solution.

9. A process of enzymatically converting glucose to fructose as defined in claim 4, wherein the glucose isomerase is derived from Streptomyces ATCC 21175.

10. A process of enzymatically converting glucose to fructose as defined in claim 1, wherein the glucose-containing solution is contacted with the bound glucose isomerase under conditions whereby less than about 1 percent psicose is produced.

11. A process of enzymatically converting glucose to fructose as defined in claim 10, wherein the glucose-containing solution is contacted with the bound glucose isomerase under conditions whereby less than about 0.5 percent psicose is produced.

12. A process of enzymatically converting glucose to fructose as defined in claim 11, wherein the glucose-containing solution is contacted with the bound glucose isomerase under conditions whereby less than about 0.1 percent psicose is produced.

13. A process of enzymatically converting glucose to fructose as defined in claim 11, wherein the glucose-containing solution is contacted with the bound glucose isomerase under conditions whereby the color of the converted solution is increased by less than 0.05 color units.

14. A process of enzymatically converting glucose to fructose as defined in claim 12, wherein the glucose-containing solution is contacted with the bound glucose isomerase under conditions whereby the color of the converted solution is increased by less than 0.03 color units.

* * * * *